(12) United States Patent
Ullmann et al.

(10) Patent No.: US 6,823,368 B1
(45) Date of Patent: Nov. 23, 2004

(54) METHOD AND SYSTEM FOR E-MAIL SENDER CHAIN HISTORY BY ADDING A SENDER-CHAIN FILED TO THE E-MAIL HEADER WHEN FORWARDING A CHAIN FORWARDED E-MAIL MESSAGE TO ANOTHER RECIPIENT

(75) Inventors: Lorin Evan Ullmann, Austin, TX (US); Joseph Kubik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 09/672,181

(22) Filed: Sep. 28, 2000

(51) Int. Cl.[7] .............................................. G06F 15/16
(52) U.S. Cl. ...................... 709/206; 709/245; 345/752
(58) Field of Search ................................. 709/206, 207, 709/245, 246; 345/752

(56) References Cited

U.S. PATENT DOCUMENTS

| | | | |
|---|---|---|---|
| 5,125,075 A | | 6/1992 | Goodale ..................... 395/200 |
| 5,659,746 A | | 8/1997 | Bankert et al. ............. 395/621 |
| 5,765,033 A | | 6/1998 | Miloslavsky ........... 395/200.36 |
| 5,767,847 A | | 6/1998 | Mori .......................... 345/329 |
| 6,108,691 A | * | 8/2000 | Lee et al. ................... 709/206 |
| 6,189,026 B1 | * | 2/2001 | Birrell et al. ............... 709/206 |
| 6,356,356 B1 | * | 3/2002 | Miller et al. ............... 358/1.15 |
| 6,615,241 B1 | * | 9/2003 | Miller et al. ............... 709/206 |
| 2002/0065891 A1 | * | 5/2002 | Malik ......................... 709/206 |
| 2003/0050981 A1 | * | 3/2003 | Banerjee et al. ........... 709/206 |
| 2003/0135567 A1 | * | 7/2003 | Reilly ........................ 709/206 |

FOREIGN PATENT DOCUMENTS

| | | | | |
|---|---|---|---|---|
| EP | 721268 A2 | * | 7/1996 | .......... H04L/12/58 |
| JP | 2003141034 A | * | 5/2003 | .......... G06F/13/00 |

* cited by examiner

*Primary Examiner*—Hosain Alam
*Assistant Examiner*—Oanh Duong
(74) *Attorney, Agent, or Firm*—Robert H. Frantz; David A. Mims, Jr.

(57) ABSTRACT

An enhanced e-mail reader and composer having automatic addressing functions to extract addresses and information regarding previous recipients of chain-forwarded electronic messages and e-mail, and having automatic addressing of new electronic messages in reply to all or some of those previous recipients. The enhanced e-mail reader is also capable of automatically adding these previous recipients to an electronic address book. An enhanced e-mail composer provides an enhanced electronic message header which indicates a chain of addresses for previous recipients of a chain-forwarded message, and interoperates with the enhanced e-mail reader.

6 Claims, 5 Drawing Sheets

METHOD AND SYSTEM FOR E-MAIL SENDER CHAIN HISTORY BY ADDING A SENDER-CHAIN FILED TO THE E-MAIL HEADER WHEN FORWARDING A CHAIN FORWARDED E-MAIL MESSAGE TO ANOTHER RECIPIENT

BACKGROUND OF THE INVENTION

1. Field of the Invention

This invention pertains to the arts of electronic message and e-mail transmission and reception, and especially to the arts of automatic address generation for e-mail composers and readers for replying to e-mail messages which have been chain-forwarded.

2. Description of the Related Art

Electronic mail and electronic messaging have become key and integral to everyday life, both in personal lives and business lives, for millions of users worldwide. The speed and accuracy with which electronic messages and e-mails are delivered is unrivaled by other forms of messaging, such as paper mail, overnight express mail, facsimile, and voice messaging.

Prior to the widespread proliferation of the Internet and Internet-based e-mail, there were many proprietary formats of electronic messaging systems, such as IBM's Lotus Notes system, Novel's DaVinci system, and others.

However, due to global acceptance and adoption of the Internet, the Internet's e-mail protocol has become the most common electronic messaging protocol in use today. The Simple Mail Transfer Protocol ("SMTP") provides for a quick, error-free and robust method for transferring electronic messages from one e-mail server to another. SMTP is primarily based upon two standards proliferated by the Internet Architecture Board ("IAB"), specifically RFC-821 "Simple Mail Transfer Protocol" and RFC-822 "Standard for the format of ARPA Internet text messages". These standards and protocols are well-known in the art. RFC-821 describes the protocol used for transferring electronic messages from one server to another, and RFC-822 describes a corresponding format for those electronic messages.

Turning to FIG. 1, the basic arrangement of client browser computer or client e-mail computers and web servers is shown. A client computer (1) may access a web-based e-mail server (5) via any computer network, such as the World Wide Web (3), or an Intranet (6) such as a LAN or WAN. This access may be made through a modem and a dial-up Internet Service Provider ("ISP"), or through a "dedicated" direct connection to the Internet. The client computer (1) is normally equipped with an e-mail composer and reader program, such as Quailcomm's Eudora, Netscape's Messenger, or Microsoft's Outlook programs. These and many other widely available programs are compliant with the SMTP standards, and interoperate with e-mail servers over computer networks such as the World Wide Web.

Turning to FIG. 2, the arrangement (20) as defined by the RFC's of a sender server (23) and a receiver server (25) using the SMTP protocol is shown. A user (21) may author a SMTP-compliant message and send that message to an e-mail sender server (23). Using a series of SMTP commands (24) which are communicated to a receiver SMTP server (25) via a computer network, the electronic message is transferred from the sender SMTP (23) to the receiver SMTP server (25).

The receiver SMTP (25) server typically stores the received electronic message within its file system (26) for later retrieval by the intended recipient. The addressing and routing scheme used by e-mail servers to transmit and route electronic messages to each other using of this protocol are well-known within the art, and are also defined in the public RFC documents of the IAB.

Eventually, the recipient uses his computer (28) to download the messages from the receiver server (25), and to read, reply, or forward the messages. His computer (28) is usually equipped with e-mail reading and authoring software, which may include an e-mail address book (27).

The generalized message format of an electronic message is shown in Table 1. An electronic message is typically divided into two portions, a header and a body. Within the header are multiple tags or fields which indicate the source and destination of the message and other useful information.

TABLE 1

Generalized Electronic Message Format

Received: from source by local_server; time_of_day
From: senders_name <senders_email_address>
Reply-to: <senders_email_address>
To: recipients_name <recipients_email_address>
Subject: text_of_the subject_line
Content-type: type_of_content_such_as_MIME
Text of the actual message In the example generalized message format shown in Table 1, there is a "Received" header field, a "From" header field, a "Reply-To" field, and a "To" field. These are also followed by a "Subject" field and then finally by the text of the actual message. These fields are generated by the e-mail composer on the originator's computer, and they are used by the various e-mail servers within the computer network to route the messages to the correct recipient.

As shown in Table 1, the "Received:" message header field shows information regarding which server received the message and at what time of day it was received by the local server. The "From" field in the message header shows the originator's or the sender's name and address. The "Reply-To" field shows the sender's e-mail address for use in replying to the sender. The "To" field shows the intended recipient's name and/or recipient's e-mail address. And, the "Subject" field shows a text string to be displayed when the e-mail is viewed among other e-mails in a mail box.

Most e-mail composer and reader programs allow messages to be forwarded to second, third, and subsequent recipients. For example, a sender may author an original message and send it to a first recipient. The first recipient may read that message, append comments to it and forward it to a second recipient. Table 2 shows a generalized message format for forwarded electronic messages which uses using a method of forwarding called "inline content".

TABLE 2

Generalized Forwarded Electronic Message
Format using Inline Type of Forwarding

Received: from source by local_server; time_of_day
From: first_recipients_name <first_recipients_email_address>
Reply-to: <first_recipients_email_address>
To: second_recipients_name <second_recipients_email_address>
Subject: FWD:text_of_the_subject_line_written_by_the_originator
Content-type: type_of_content_such_as_MIME
Content-disposition: inline

TABLE 2-continued

Generalized Forwarded Electronic Message
Format using Inline Type of Forwarding

Text of the message written by the first recipient intended for the second
   recipient
Boundary_tag
Received: from source by local_server; time_of_day
From: originator_name <originators_email_address>
Reply-to: <originators_email_address>
To: first_recipients_name <first_recipients_email_address>
Subject: FWD:text_of_the_subject_line_written_by_the_originator
Content-type: type_of_content_such_as_MIME
Text of the actual message written by the originator and intended for the
   first recipient
Boundary_tag This forwarded message format resembles the generalized message format of Table 1, especially in the initial message header, including the "received" field, "from", "reply-to", "to", and "subject" fields. However, most programs modify the text contained in the "subject" field to include an indication that this is a forwarded message, such as appending the letters "FWD" prior to the actual text of the originator's subject line. Following this message header, the text of the comments authored by the first recipient and intended for the second recipient are given. Then, according to the inline forwarding method, a boundary tag is given which indicates the beginning of the actual forwarded message. Following the first boundary tag, another set of message header fields are shown which are the message header fields from the original message from the original sender of the message. These message fields are then followed by the text of the original message from the originator, and is concluded by a closing boundary tag.

Another method for forwarding an electronic message to another recipient is by "attaching" the original message to the new message. The SMTP protocol allows for files of all types to be "attached" to an electronic message, and as such, one method for forwarding a message is to create a new message to the next recipient, and to attach the old message to this new message.

As shown in Table 3, the general format of a forwarded message as an attachment is seen.

TABLE 3

Generalized Forwarded Electronic Message Format
using Attachment Type of Forwarding Received: from source by local_server; time_of_day
From: first_recipients_name <first_recipients_email_address>
Reply-to: <first_recipients_email_address>
To: second_recipients_name <second_recipients_email_address>
Subject: FWD:text_of_the_subject_line_written_by_the_originator
Content-type: type_of_content_such_as_MIME
Content-disposition: inline
Text of the message written by the first recipient intended for the second
   recipient
Start-of-attachment-tag
   Received: from source by local_server; time_of_day
   From: originator_name <originators_email_address>
   Reply-to: <originators_email_address>
   To: first_recipients_name <first_recipients_email_address>
   Subject: FWD:text_of_the_subject_line_written_by_the_
     originator
   Content-type: type_of_content_such_as_MIME
   Text of the actual message written by the originator and intended for
     the first recipient
End-of-attachment-tag This message begins similar to the message in Table 2 in that it is preceded by a new message header containing multiple header fields, including the "received", "from", "reply-to", "to", "subject" fields. However, in this case following the text of the comments written by the first recipient for the second recipient, there are special tags to indicate that there is attached file rather than the inline copy of the forwarded file. This may be the same type of tag that may be used to attach a data file or other type of file to the electronic message, but in this case the attached file is simply a text file which is actually the original message from the originator.

Thus, if one looks within that attached file, one will see that there is the original set of message header tags which indicate the originator's name, the first recipient's name (or the previous recipient's name) and other useful information regarding the previous message.

A subsequent recipient may choose to forward the message to another recipient, thereby forming a chain-forwarded message which may have the original message forwarded through a combination of methods.

All of these message header fields are used for various functions of the e-mail reader and e-mail composer software. If a user wants to reply to the sender of a message he may simply click or select a "reply" function in response to which the composer will be invoked and will automatically address the message to the address indicated in the "reply-to" field of the message. Also, the user may forward the message quite simply by clicking a "forward" button (or otherwise invoking a forward function), which causes the composer to allow creation of a new messaging containing or attaching the first message, and giving the user the capability to enter the next recipient's address and any comments he or she wishes to include.

Another useful function of common e-mail composers and readers available in the art today is that of an address book. An address book stores names and e-mail addresses of other users who are commonly communicate with the user. Most e-mail composers and readers also include automatic functions for adding a message sender's address and information to an address book.

However, with the inline and attachment methods of forwarding electronic messages, addresses for the previous recipient's and the originator of forwarded messages cannot be easily or automatically added to the address book, other than that of the most immediate previous recipient. Further, they cannot be automatically responded to or forwarded to as they are not currently indicated in the first group of message header fields of the forwarded message.

Thus, a user must resort to attempting to type manually each of the previous recipient's e-mail addresses, if he knows them. For example, if a message is forwarded five times from an originator, the fifth recipient can automatically reply to the fourth recipient using the available automatic functions of current e-mail composers, however, he cannot easily reply to all four previous recipients and originator without manually retyping the addresses of each of those parties. Further, he cannot easily add any of these previous recipients and the originator to his address book, except for the fourth recipient.

A third method of forwarding e-mail messages is by "quoting" the actual message into the text of the new message intended for the next recipient. In this method, none of the previous header fields are forwarded to the next recipient. A simple line of text such as "Previous_recipient wrote:" may be inserted above the quoted text, and the quoted text may be set apart such as using a character such as ">" or a blue bar in the left margin.

In this case, it is much more difficult for the recipient of a chain-forwarded message to reply to previous recipients because the information regarding the previous recipient's addresses has been completely stripped from the forwarded message.

Therefore, there is a need in the art for a system and method which can automatically determine the list of chain recipient's of a chain-forwarded electronic message. Further, there exists a need in the art for this system and method to be compatible with existing electronic messaging standards, to be realizable using existing electronic messaging client computer and server computer apparatus, and to be compatible with the multiple methods of forwarding messages available in the art today.

BRIEF DESCRIPTION OF THE DRAWINGS

The following detailed description, when taken in conjunction with the figures presented herein, provides a complete description of the invention.

SUMMARY OF THE INVENTION

An enhanced e-mail reader is provided with automatic addressing fictions to extract addresses and information regarding previous recipients of chain-forwarded electronic messages and e-mail, and to allow automatic addressing of new electronic messages in reply to all or some of those previous recipients. The enhanced e-mail reader is also capable of automatically adding these previous recipients to an electronic address book. An enhanced e-mail composer provides an enhanced electronic message header which indicates a chain of addresses for previous recipients of a chain-forwarded message, and interoperates with the enhanced e-mail reader.

DETAILED DESCRIPTION OF THE INVENTION

The method and system of the invention are preferably realized as software extensions, plug-ins, or applets associated with a standard electronic mail composer and reader program. This enhanced electronic composer and reader program is then executed by a standard client computer platform such as an IBM personal computer ("PC"), Apple Macintosh or iMAC, or similar computer.

Figure 1:
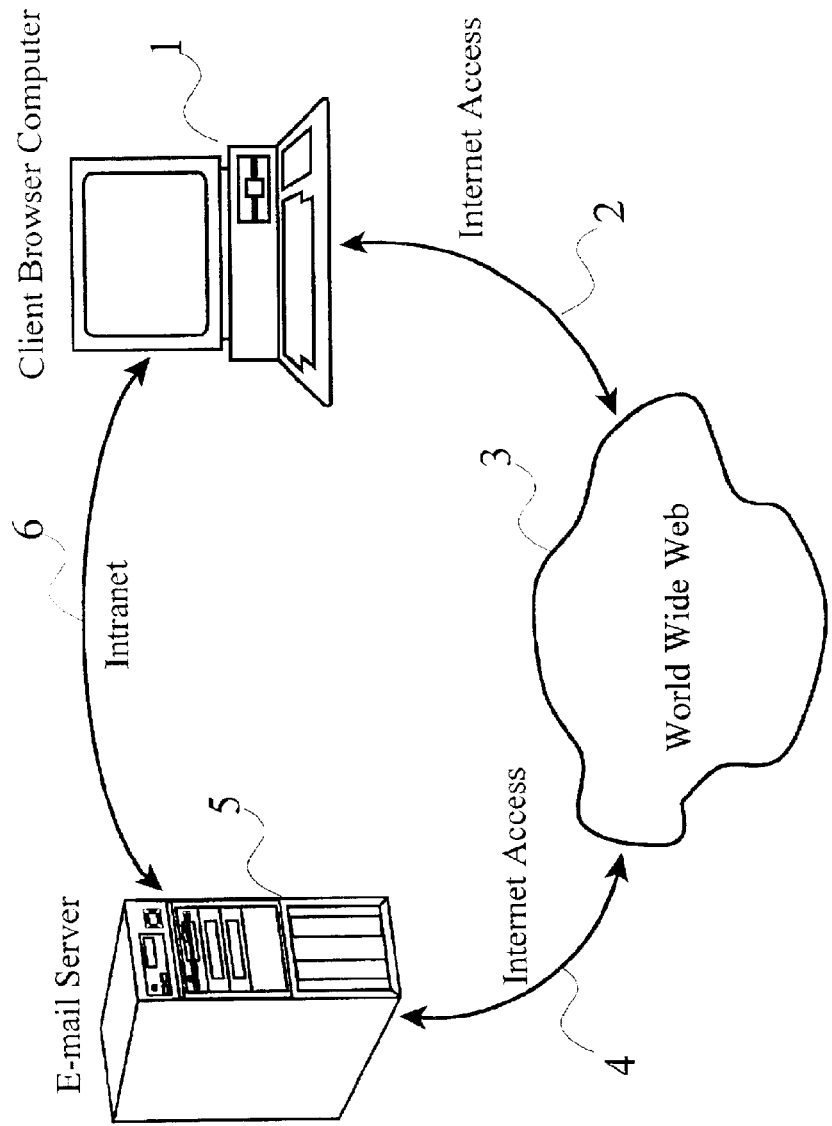
FIG. 1 shows the common arrangement of e-mail servers, client computers, and computer networks.
Figure 2:
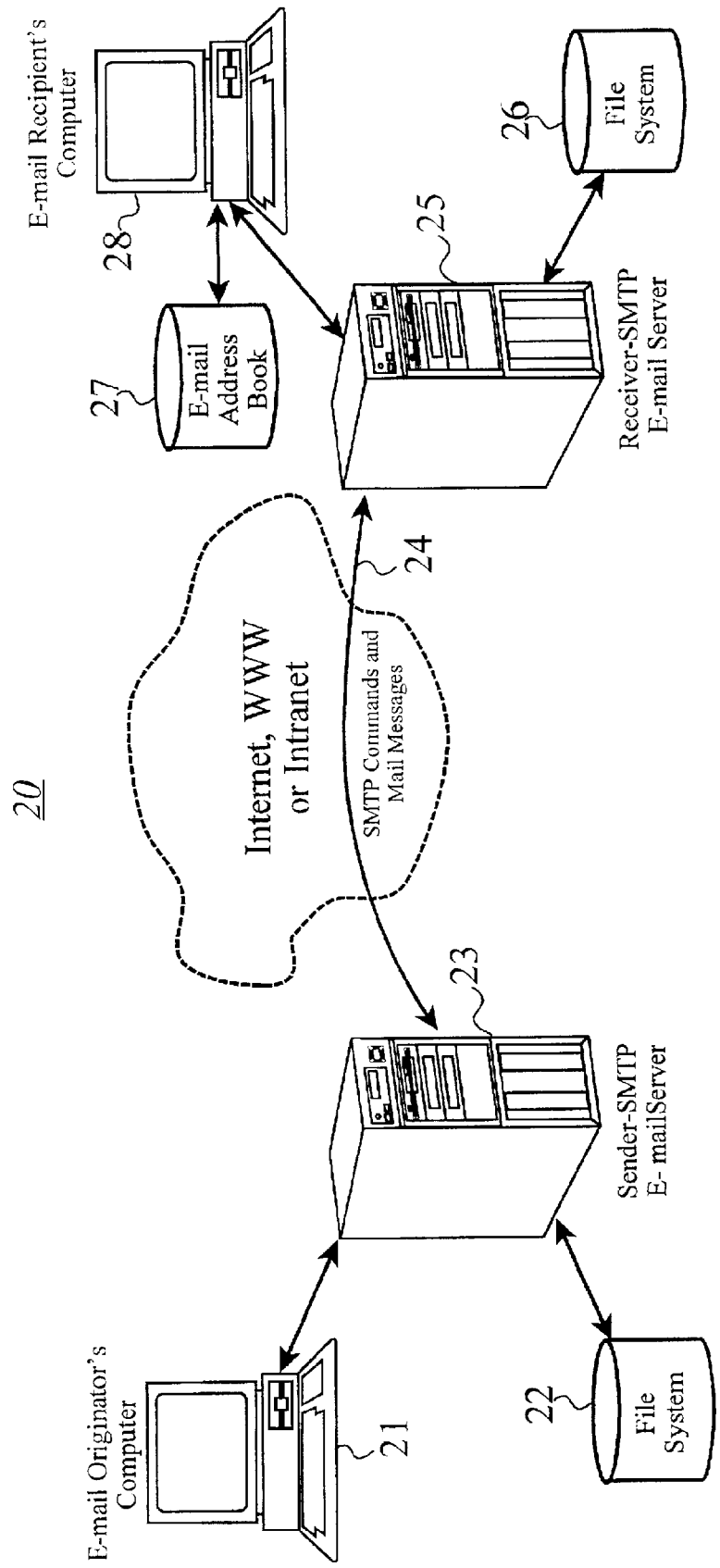
FIG. 2 shows the fundamental arrangement of e-mail sender and receiver servers.
Figure 3:
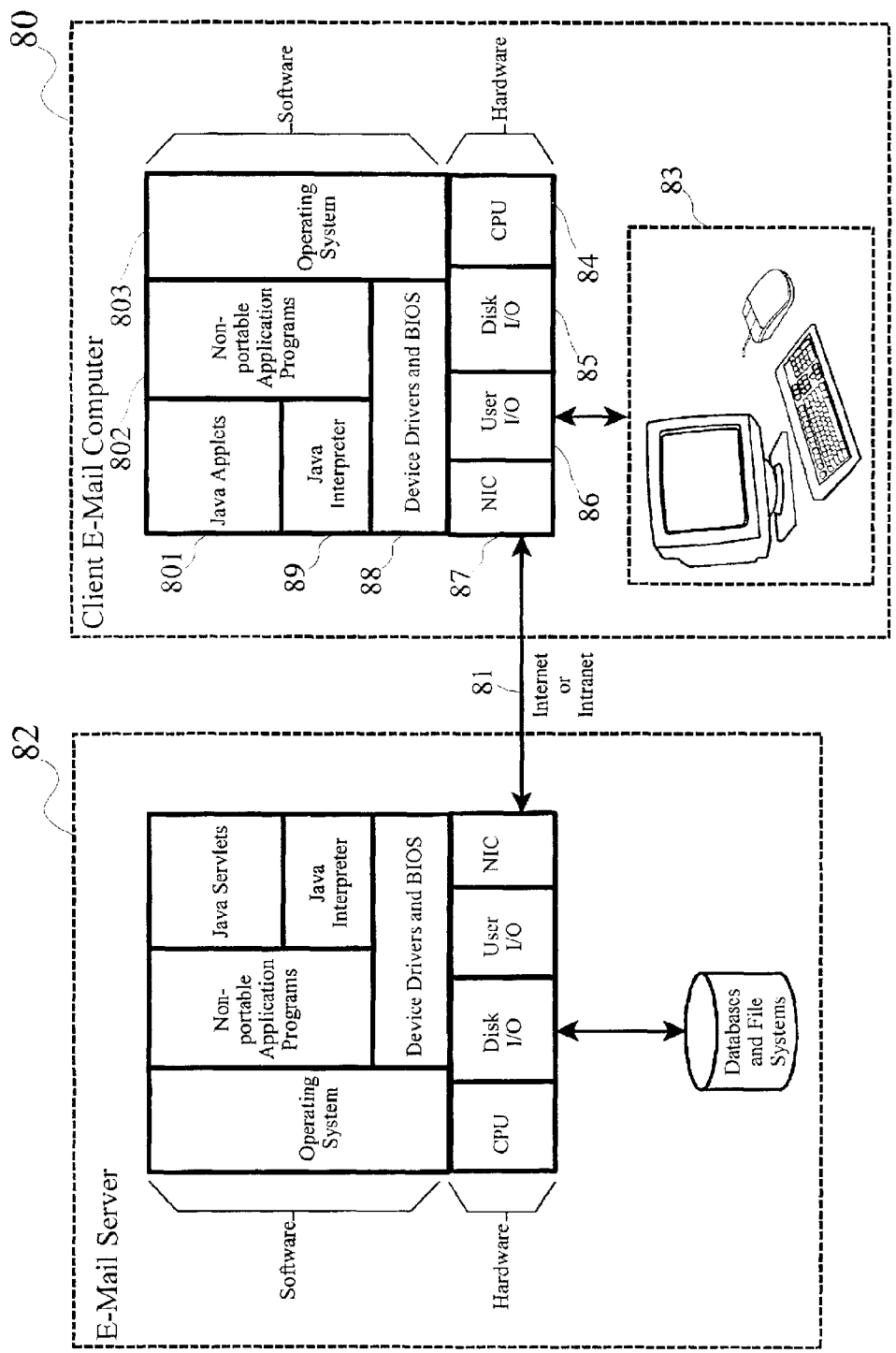
FIG. 3 depicts the basic architecture of e-mail servers and a client computers.

As shown in FIG. 3, the preferred embodiment includes a client computer (80) which has a central processing unit (84), disc input and output (85) for communicating for floppy disks, hard drives, and CD ROM's, user IO device interfaces (86) such as a display, keyboard, and mouse (83), and a network interface card (87) for interfacing to a computer network such as the Internet or an Intranet (81). The preferred embodiment of the client computer includes device drivers and a bios (88), an operating system such as the Microsoft Windows operating system or IBM OS/2 operating system. The computer platform (80) further comprises non-portable application programs (802) such as the e-mail composer and reader program. The preferred embodiment of the client computer (80) also includes a Java interpreter (89) capable of executing Java applets (801). The e-mail composer and reader such as Netscapes' Messenger program is installed as a non-portable application program (82). The method of the invention may be implemented as changes within the e-mail composer and reader program or as a plug-in modules such as a Netscape Plug-in. Alternatively, it may be implemented as an applet such as a Java applet The methods for extending such program code, developing a browser plug-in, or an applet is well understood in the art.

Figure 4:
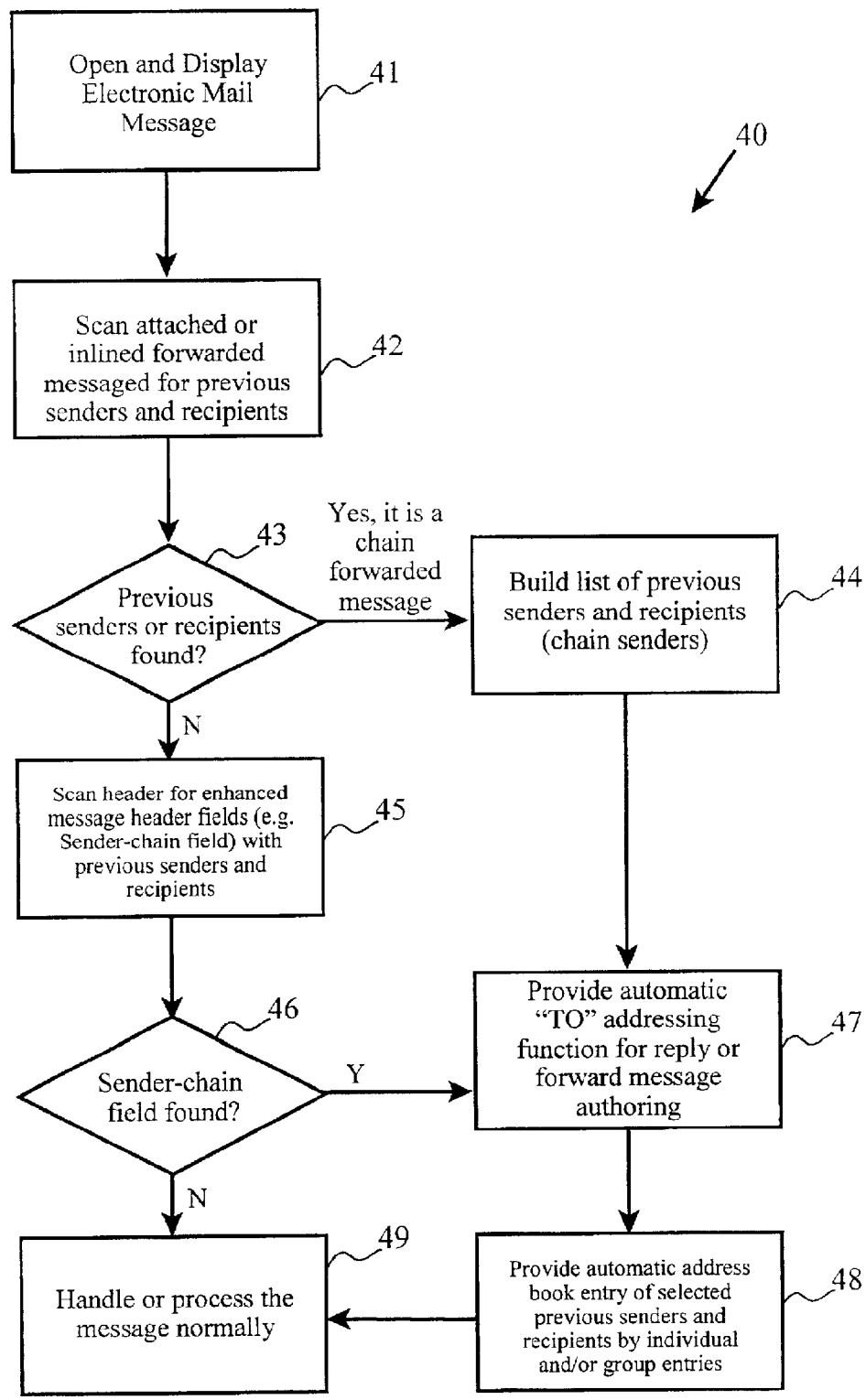
FIG. 4 shows the logical process of an enhanced e-mail reader.

The logical process (40) of the enhanced e-mail reader is shown in FIG. 4. First, a standard electronic message is opened and displayed (41). Then, the text or code of the message is scanned for attached or inlined forwarded messages, searching for previous recipient message header fields (42), such as the "from" and "reply-to" fields of SMTP e-mail message.

If any of these previous recipient's message header fields are found (43), then a list of the previous recipient's addresses or return addresses is built (44). A user dialogue is provided to allow for automatic addressing to the entire list or part of the list of previous recipients (47). Further, the user is provided with a function which allows him to add entries from this previous recipients list to his or her address book automatically (48), either by individual entries or by groups of entries.

Then, the rest of the message is processed and handled normally (49). If no previous recipient message header fields are found when the message is scanned for attached or inlined messages (43), then the e-mail reader scans for any enhanced message header fields which may indicate previous recipients (45). If this special field is found, then the user is provided the functions to allow for automatic addressing to all previous recipients (47), and to add any or all of the previous recipients to his or her address book (48). If the field is not found, then the remaining message is handled normally (49).

Figure 5:
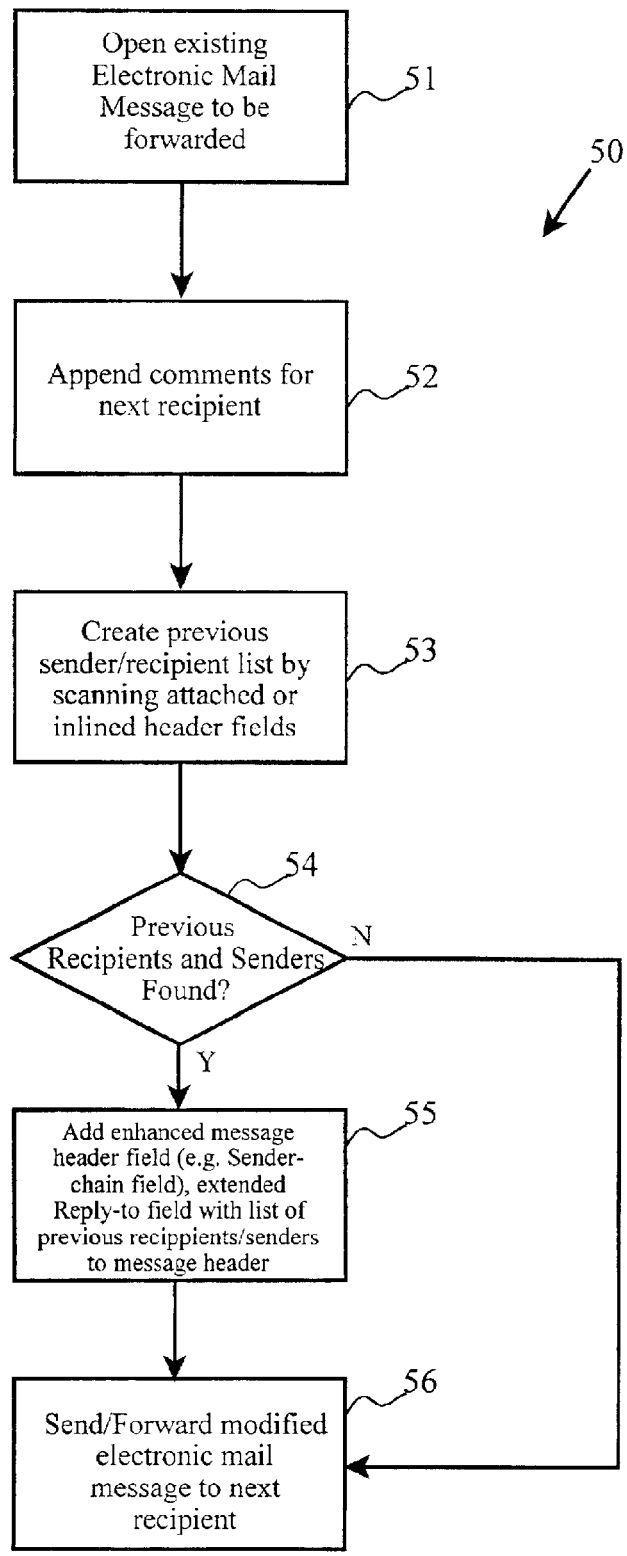
FIG. 5 shows the logical process of an enhanced e-mail composer.

Turning to FIG. 5, the logical process of the enhanced e-mail composer is shown. The enhanced e-mail reader previously disclosed is compatible with the two modes of prior art forwarding of electronic messages, namely, the methods of inlining and attaching the forwarded message. However, as a quoted forwarded message does not include any of the message header fields from the previous recipients, the enhanced e-mail reader of FIG. 4 may also find a special message header field indicating the chain-recipients of a quoted chain-forwarded message.

In order to provide this feature, the logical process (50) shown in FIG. 5 is preferably implemented in an enhanced e-mail composer. When the user invokes the electronic message authoring function of the e-mail composer (51) and indicates that he wants to forward a previously received message, he is provided the normal opportunity to append comments for the next recipient (52). Then, a special field containing the list of previous recipients, which may be generated by scanning the attached or inlined header fields (53) of the original message, is created and added to the new forwarded message.

One embodiment of this special field is shown in Table 4 as the "Sender-Chain" field, which includes a list of previous recipients and/or the originator's name and address. This field may be ignored by other older or non-enhanced versions of e-mail readers, but may be detected and used by enhanced e-mail readers. If no message fields are detected for the previous recipients (54), then the message is sent to the next recipient using a normal unmodified forwarding message.

TABLE 4

Enhanced Forwarded Electronic Message Format
using New Header Field for Sender-Chain Received: from source by local_server; time_of_day
From: first_recipients_name <first_recipients_email_address>
Reply-to: <first_recipients_email_address>
To: second_recipients_name <second_recipients_email_address>
Subject: FWD:text_of_the_subject_line_written_by_the_originator
Content-type: type_of_content_such_as_MIME
Content-disposition: inline/attachment
Sender-Chain: originator_name <originators_email_address>;
   first_recipients_name <first_recipients_email_address>
Text of the message written by the first recipient intended for the second recipient
Boundary tags bracketing inline forwarded message(s) or attachment tags bracketing attached message (s)

Alternatively, the "Reply-To field" in the forwarded message header may be appended to include a list of previous recipients such that the user may simply click or select "Reply to All" function of the e-mail composer to invoke the full list of previous recipients, as shown in Table 5.

TABLE 5

Enhanced Forwarded Electronic Message Format
using Multiple Sources in Message
Header "Reply-To" Field for Sender-Chain Received: from source by local_server; time_of_day
From: first_recipients_name <first_recipients_email_address>
Reply-to: <first_recipients_email_address>; originator_name
   <originators_email_address>;
To: second_recipients_name <second_recipients_email_address>
Subject: FWD:text_of_the_subject_line_written_by_the_originator
Content-type: type_of_content_such_as_MIME
Content-disposition: inline/attachment
Text of the message written by the first recipient intended for the second recipient
Boundary tags bracketing inline forwarded message(s) or attachment tags bracketing attached message(s)

In summary, methods for enhancing standard e-mail and electronic message readers and composers have been disclosed to allow realization of enhanced e-mail and electronic message readers and composers which provide automatic addressing and address book management functions for chain-forwarded messages. Certain details of the preferred embodiments have been disclosed, along with alternative approaches to realize the invention. It will be recognized by those skilled in the art that many alternatives from the disclosed preferred embodiment, such as the use of alternate programming methodologies or languages, alternate computing platforms, or alternate electronic message and e-mail standards, may be taken within the spirit and scope of the invention which is defined by the following claims.

What is claimed is:

1. A method for managing sender address information in a chain forwarded electronic mail message in an electronic messaging system, said sender address information having a plurality of previous sender addresses, said electronic mail message having a header section and a body section, said header section containing fields indicating the sender address of a most recent sender of an electronic mail message, said body section containing a forwarded message and fields indicating chain sender addresses of senders prior to said most recent sender of an electronic mail message, said electronic messaging system having a user display and a user interface for receiving commands and input from a user, said method comprising the steps of:

searching said body section of said electronic mail message for said chain sender addresses of senders having sent said message prior to said most recent sender; and adding a Sender-chain field to an electronic mail message header section when forwarding the chain forwarded electronic mail message to another recipient, said Sender-chain field being associated with a list of chain sender addresses found during the step of searching the body section and being associated with the address of the most recent sender's address.

2. The method as set forth in claim 1 wherein said step of searching the body section further comprises searching a Simple Mail Transfer Protocol message.

3. The method as set forth in claim 1 wherein said step of adding a chain sender field further comprises adding a Sender-chain field to a Simple Mail Transfer Protocol message.

4. A computer-readable media containing computer program code for managing sender address information in a chain forwarded electronic mail message in an electronic messaging system, said sender address information having a plurality of previous sender addresses, said electronic mail message having a header section and a body section, said header section containing fields indicating the sender address of a most recent sender of an electronic mail message, said body section containing a forwarded message and fields indicating chain sender addresses of senders prior to said most recent sender of an electronic mail message, said electronic messaging system having a user display and a user interface for receiving commands and input from a user, and said electronic message system having a processor for executing computer program code such that when said computer program code executed by said processor, said electronic message system performs the steps of:

searching said body section of said electronic mail message for said one or more chain sender addresses of senders having sent said message prior to said most recent sender; and adding a Sender-Chain field to an electronic mail message header section when forwarding the chain forwarded electronic mail message to another recipient, said Sender-Chain field being associated with a list of chain sender addresses found during the step of searching the body section and being associated with the address of the most recent sender.

5. The computer-media as set forth in claim 4 wherein said computer program code for performing the step of searching the body section comprises computer program code for searching a Simple Mail Transfer Protocol message.

6. The computer-media as set forth in claim 4 wherein said computer program code for performing the step of adding a Sender-Chain field further comprises computer program code for adding a Sender-Chain field to a Simple Mail Transfer Protocol message.

* * * * *